Nov. 20, 1951  J. S. SOHN  2,575,736
METHOD OF THERMOCHEMICALLY CUTTING METALS
Filed Oct. 4, 1949  4 Sheets-Sheet 1

INVENTOR
JESSE S. SOHN
BY
ATTORNEYS

Nov. 20, 1951 J. S. SOHN 2,575,736
METHOD OF THERMOCHEMICALLY CUTTING METALS
Filed Oct. 4, 1949 4 Sheets-Sheet 2

INVENTOR
JESSE S. SOHN
BY
ATTORNEYS

INVENTOR
JESSE S. SOHN

Nov. 20, 1951  J. S. SOHN  2,575,736
METHOD OF THERMOCHEMICALLY CUTTING METALS
Filed Oct. 4, 1949  4 Sheets-Sheet 4

INVENTOR
JESSE S. SOHN
BY
ATTORNEYS

Patented Nov. 20, 1951

2,575,736

UNITED STATES PATENT OFFICE 2,575,736

METHOD OF THERMOCHEMICALLY CUTTING METALS

Jesse S. Sohn, Succasunna, N. J., assignor to Air Reduction Company, Incorporated, New York, N. Y., a corporation of New York Application October 4, 1949, Serial No. 119,462

3 Claims. (Cl. 148—9)

This invention relates to a method of cutting metals thermochemically with oxygen.

The thermochemical cutting of metals by means of a jet of oxygen supplemented by preheating flames produced by combustion of gaseous mixtures, for example oxygen and acetylene, has long been practised. The kerf in the metal has been produced by applying a torch either manually or mechanically so that the metal is initially heated to its ignition temperature by the preheating flames which are followed by the oxygen jet. The latter ignites the metal and burns it away as the cutting operation advances. In all such operations, it has been necessary heretofore to move the workpiece and the torch relatively to each other in order to advance the kerf and to complete the cut. In the application of machines for cutting, this requirement leads to complications, particularly since the mechanism is subjected to relatively high temperatures for considerable periods and also to the fume and dust arising from the operation.

It is the object of the present invention to provide an improved method of cutting metals thermochemically, avoiding the necessity for relative movement of the torch and workpiece.

Another object of the invention is the provision of a method of cutting metals thermochemically in which a plurality of cutting jets of oxygen with complementary heating flames are applied successively to the workpiece in predetermined order to initiate and to advance the kerf.

A further object of the invention is the provision of a method of cutting metals thermochemically in which cutting may proceed simultaneously from both sides of the workpiece, thereby eliminating half of the time required to complete the kerf.

Other objects and advantages of the invention will be apparent as it is better understood by reference to the following specification and the accompanying drawing, in which Fig. 1 is a sectional view of an apparatus suitable for the practice of the method;

In accordance with the novel procedure of the present invention, it is unnecessary to provide for relative movement of the torch and workpiece. The cutting is accomplished by applying successively and progressively to the workpiece each of a plurality of cutting jets of oxygen complemented by heating flames contiguous with each cutting jet. Thus the cutting is initiated by the application of heating flames and a cutting oxygen jet at one end of the desired kerf. Instead of moving the workpiece or the torch, these parts are relatively fixed and the torch is provided with means for shutting off the initial oxygen jet after it has performed its function and substituting therefor a second, a third, and successive jets, each with complementary heating flames, as the kerf advances until the cut is completed. By suitable arrangement of the means for feeding gases, they are supplied only to the active jets, each jet going into play as it is required to advance the kerf. Thus the jets are employed in a sort of step-by-step relation.

Although it is not essential to the invention, the jets can be made operative simultaneously at opposite sides of the workpiece to initiate the cut and the kerf can be advanced from the sides to the middle of the workpiece where it is completed. This obviously reduces the cutting time by one-half and is advantageous for that reason as well as for others.

Apparatus suitable for the practice of the method may take various forms, that hereinafter described being the best presently available and being employed as an illustration to render the subject matter more readily understandable.

Figure 4:
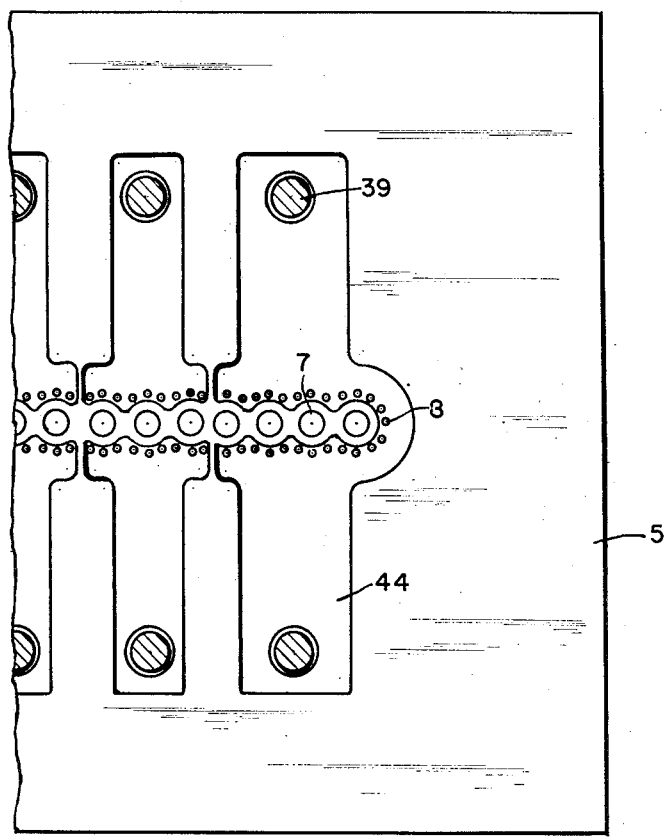
Fig. 4 is an enlarged section on the line 4—4 of Fig. 1.
Figure 6:
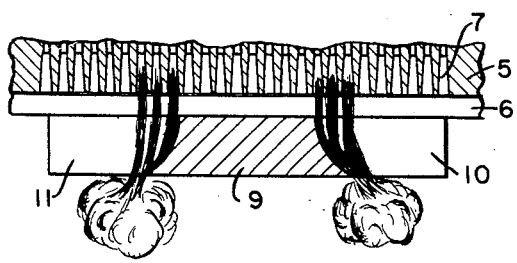
Fig. 6 is a diagrammatic view illustrating one mode of practising the invention.

Referring to Fig. 6 of the drawing, the method as hereinbefore explained, is accomplished by the use of a torch tip 5 which may carry protective shoes 6. The torch tip has a plurality of oxygen jet passages 7 and complementary passages 8 (Fig. 4) for combustible gas to afford heating flames. The workpiece 9 is disposed beneath the tip 5. As indicated, the kerfs 10 and 11 have been initiated from opposite ends of the workpiece by the application of cutting oxygen jets and complementary heating flames applied first at the opposite sides of the workpiece 9. Thus, the cutting oxygen jets from the passages 7 at opposite ends of the tip, with their complementary heating flames, initiate the kerf and, as the kerf advances, cutting oxygen jets from successive passages 7 from both ends of the torch tip 5 are applied successively and progressively. As shown, the kerf has already advanced. Consequently, the cutting oxygen jets at the ends of the torch tip 5 have been shut off, while those adjacent the ends of the two kerfs are active, and intermediate cutting jets are likewise inactive but will become active as the kerf advances until it is completed. As already pointed out, the arrangement may be such that the kerf advances only from one side of the workpiece. In other words, the oxygen jets are activated progressively from one end of the torch tip 5 to the other. Throughout this operation, neither the torch tip nor the workpiece is moved. Only the kerf advances as the result of the successive and progressive application of the cutting oxygen jets supplied as needed to the respective cutting oxygen passages 7. This procedure avoids all of the mechanical difficulties inherent in an operation which requires relative movement of the torch and workpiece. At least one of the cutting oxygen jets must be in operation at all times to avoid discontinuity of the kerf. Thus, as shown in Fig. 6, three cutting jets are in operation from each end of the kerf. As one is discontinued, another jet comes into operation progressively until the kerf is completed.

A suitable apparatus permitting the delivery of oxygen to the respective jets and of heating gases to the complementary heating flames is illustrated in Figs. 1–5 of the drawing. The torch tip 5, with the protective shoes 6, is supported beneath three valve blocks 12, 13 and 14. The valve blocks are provided with connections 15, 16 and 17 through which cutting oxygen, a combustible gas such as acetylene and oxygen to be mixed with the combustion gas are supplied, respectively. Thus the valve block 12 controls the feeding of the cutting oxygen, the valve block 13 controls the feeding of the combustible gas, and the valve block 14 controls the feeding of the oxygen to be mixed with the combustible gas. Within the valve block 12, a cylindrical valve 18 is mounted for rotation. The end of the valve 18 opposite the gas inlet is closed by disc 19 which is connected to a shaft 20 extending from the end of the valve block 12 and carrying a pinion 21 secured by a set screw 22 to the shaft. The valve 18 is provided with a plurality of orifices 23 arranged in a helical line. In the specific form illustrated in Fig. 1, the orifices 23 are designed to feed oxygen to the passages 7 simultaneously from opposite ends of the tip 5 to the center thereof. They may be arranged to feed the oxygen to the passages 7 successively and progressively from only one end of the tip. It will be understood that the structure described is arranged to prevent leakage of gas from the valve block 12 so that the gas can escape only through the orifices 23 into the passages 7.

A valve block 13 includes a similar valve 24 except that the apertures 25 therein are elongated and are adapted to register as the valve rotates with passages 26 extending through the wall of the valve block into milled recesses 27. The valve 24 is rotated by a shaft 28 extending through the end of the valve block and carrying a pinion 29 which meshes with the pinion 21.

The valve block 14 includes a similar valve 30 having apertures 31 which are elongated as shown and adapted to register with passages 32 extending through the wall of the valve block to milled recesses 33 similar to the recesses 27.

The valve 30 is connected to a shaft 34 carrying a pinion 35 which meshes with the pinion 29. The pinion 35 meshes with a pinion 36 on a shaft 37 driven by a motor 38. Thus, when the motor 38 is in operation, the shafts 34, 28 and 20 are rotated simultaneously and in timed relation. Thus, the various gases are fed in the required proportions to the respective outlets therefor.

Figure 1:
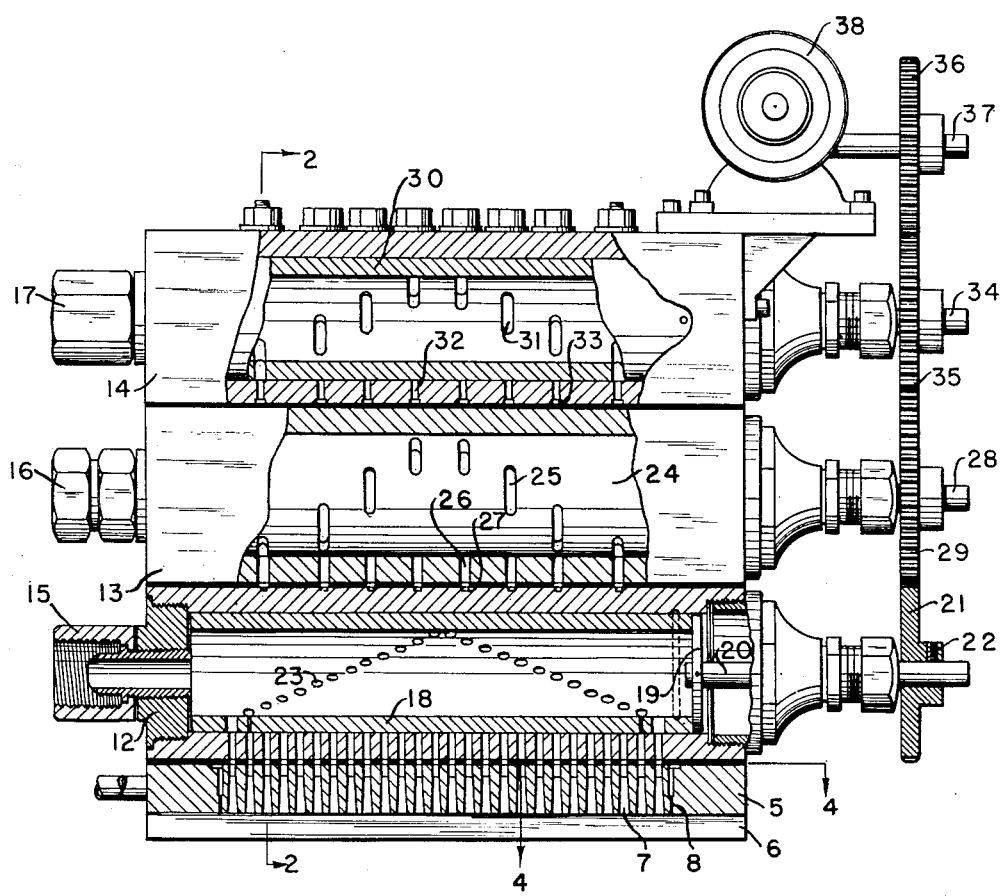
Figure 2:
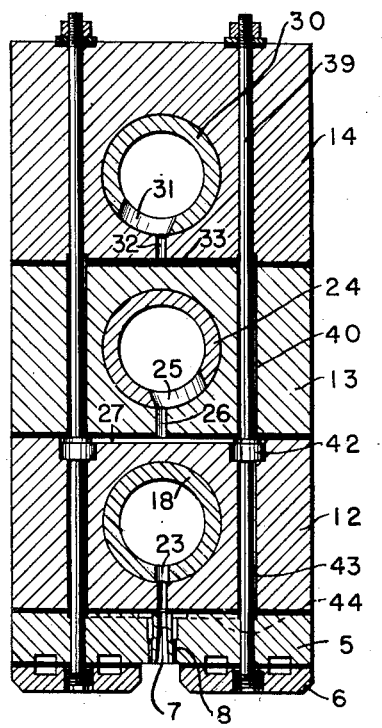
Fig. 2 is a section on the line 2—2 of Fig. 1.
Figure 3:
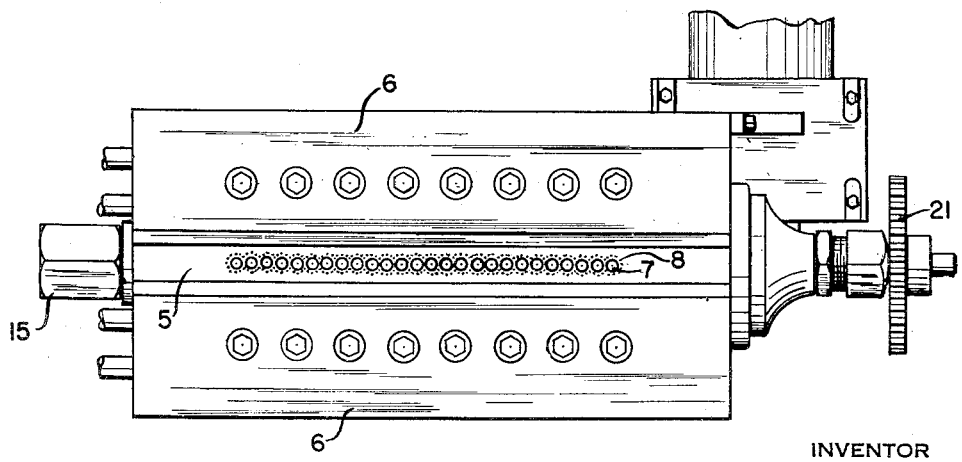
Fig. 3 is a plan view of the bottom of the apparatus.

In order that the combustible and combustion-supporting gases supplied through the valves 30 and 24 may be properly mixed, the valve blocks 12, 13 and 14 and the tip 5 and protective shoes 6 are connected by bolts 39 extending therethrough. In the blocks 13 and 12, as shown in Fig. 2, the holes for the bolts are oversize, affording passages 40 and 43. Thus, the oxygen gas supplied by the valve 30 to the recess 33 is delivered through the passage 40 to a mixing chamber 42 where it meets and mixes with the combustible gas supplied through the valve 24. The mixed gas from the mixing chamber 42 is delivered through passages 43 around the bolts 39 to the milled recesses 44 and thence to the passages 8 contiguous to the cutting oxygen passages 7. It will be noted that the recesses 44 are discontinuous, so that combustible gases are supplied for the heating flames around the oxygen jet passages 7 progressively as the kerf advances. Thus, combustible gases will be supplied from the recess 44 at the right of Fig. 4 only while such gases are needed, and thereafter through successive recesses 44, from right to left, as required. Hence the heating of the metal and the cutting of the kerf will progress in the desired direction as the apparatus operates, and no gases will be wasted.

Figure 5:
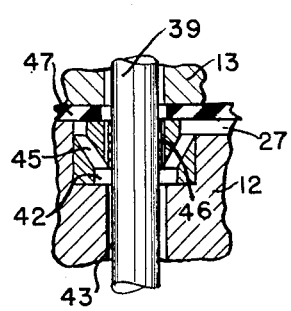
Fig. 5 is an enlarged sectional view illustrating the means for mixing the heating gases.

The preferred structure of the mixing chamber 42 is illustrated in Fig. 5, in which the block 12 and the bolt 39 are shown with the mixing chamber 42 supplied with a combustible gas through a passage 45 and the combustion supporting gas through a passage 46. The mixture is delivered through the passage 43 surrounding the bolt 39. Suitable gasket material 47 may be provided between the blocks 12 and 13 to prevent leakage of gases.

Figure 7:
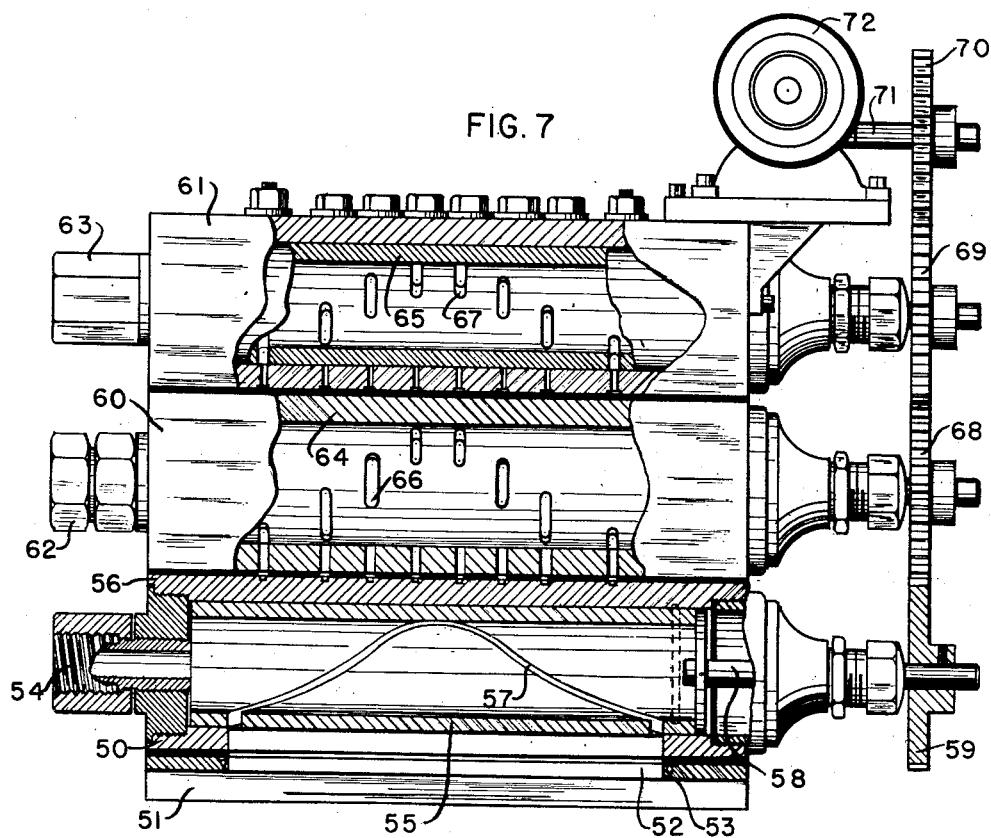
Fig. 7 is a vertical section through a modified form of the apparatus.
Figure 8:
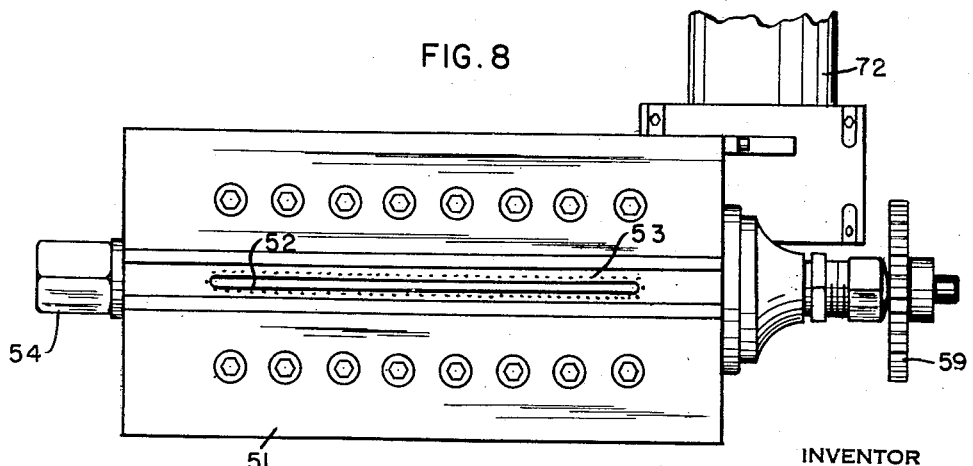
Fig. 8 is a plan view of the bottom of the apparatus shown in Fig. 7.

In Figs. 7 and 8 of the drawing, I have illustrated a slightly modified form of the invention in which the oxygen jet passages for the cutting oxygen are replaced by a slot and the controlling valve is modified by the provision of a helical slot which, as the valve is rotated, registers with the slot in the torch tip and directs the equivalent of a jet of oxygen which moves progressively along the slot in the torch tip, thus permitting the development of the kerf without moving the torch relatively to the workpiece. Referring to the drawing, 50 indicates the torch tip having protective shoes 51. A slot 52 extends longitudinally of the torch tip, and complementary heating gas passages 53 are disposed along the edges of the slot to permit the application of heating flames progressively as in the previously described embodiment of the invention.

The cutting oxygen is supplied through a passage 54 to the interior of a rotary valve 55 supported in the valve block 56. A helically formed slot 57 is formed in the valve 55. As shown, the slot is designed to permit the application of cutting jets from each end of the torch tip, but it may be so formed that the oxygen is supplied progressively from one end of the torch tip so that the kerf is cut completely across the workpiece instead of from both ends thereof. The rotary valve 55 is driven through a shaft 58 carrying a pinion 59.

As in the preceding embodiment of the invention, valve blocks 60 and 61 are provided with connections 62 and 63 for combustible gas and combustion-supporting gas, i. e., oxygen, respectively. The valve blocks 60 and 61 enclose rotary valves 64 and 65 having slots 66 and 67 adapted to progressively feed the combustible gas and the combustion-supporting gas to a mixing chamber (not shown) but substantially as in the preceding embodiment of the invention, and eventually to the heating gas passages 53. The rotary valves 64 and 65 are driven by pinions 68 and 69 and by a pinion 70 connected to a shaft 71 actuated by a motor 72. Since the mechanism, except for the particular form of the valve 55 and the provision of the slot 52 in the torch tip, is identical with the modification previously described, a further detailed description of this mechanism is unnecessary. It functions in substantially the manner hereinbefore described, affording heating jets which move progressively along the workpiece, the unnecessary jets being extinguished while new ones come into play. Meanwhile, the cutting oxygen jet engages the workpiece at one or both ends thereof and, as the valve 57 rotates, the cutting oxygen jet moves progressively as the kerf advances, and the cutting is accomplished without relative movement of the torch tip and workpiece.

Although the mechanisms as described are those best adapted to produce the desired result, it is apparent that other forms of timed valve mechanism may be utilized for the purpose of supplying the necessary gases to the tip in the proper quantity and in such a manner as to allow the cutting oxygen jets to be applied successively and progressively to the workpiece.

Various changes may be made in the structure and mode of operation of the parts without departing from the invention or sacrificing the advantages thereof.

I claim:

1. A method of thermochemically cutting a ferrous metal workpiece which comprises positioning torch means having a row of closely spaced cutting oxygen orifices in operative position with respect to the work to be cut and fixed in the direction of a desired cut throughout the cutting operation, projecting a jet of cutting oxygen onto the workpiece from a first of said orifies to thermochemically remove metal therefrom, thereafter projecting a jet of cutting oxygen from a second orifice immediately adjacent said first orifice and downstream therefrom in the direction of the cut after said first oxygen jet has been in operation, but before its cutting action is completed, whereupon said second oxygen jet thermochemically removes metal from said workpiece adjacent the point at which metal was removed by said first oxygen jet and so related thereto that the thermochemical action completely removes the metal between said jets to form a unitary kerf while said torch means is maintained stationary with respect to said work, discontinuing the projection of cutting oxygen from said first orifice after its cutting action is completed, projecting a jet of cutting oxygen from a third orifice immediately adjacent said second orifice and downstream therefrom while the jet of cutting oxygen from the second orifice is being projected onto the work and before its cutting action is completed, and successively and progressively projecting jets of cutting oxygen from said orifices and discontinuing the projection thereof in such manner in the direction of the cut.

2. The method of thermochemically cutting a ferrous metal workpiece as defined in claim 1 in which complementary heating flames are projected onto the workpiece adjacent where the oxygen jets are projected onto it to assist the action of the oxygen in cutting the workpiece.

3. The method of thermochemically cutting a ferrous metal workpiece as defined in claim 1 in which the cutting of the metal progresses inwardly simultaneously from opposite sides of the workpiece.

JESSE S. SOHN.

REFERENCES CITED

The following references are of record in the file of this patent:

UNITED STATES PATENTS

| Number | Name | Date |
| --- | --- | --- |
| 1,142,355 | Mueller | June 8, 1915 |
| 1,554,408 | Coberly | Sept. 22, 1925 |
| 2,266,208 | Jones | Dec. 16, 1941 |
| 2,345,314 | Anderson | Mar. 28, 1944 |
| 2,347,245 | Anderson | Apr. 25, 1944 |
| 2,442,437 | Robbins et al. | June 1, 1948 |
| 2,448,098 | Hughey | Aug. 31, 1948 |
| 2,483,719 | Anderson | Oct. 4, 1949 |
| 2,501,724 | Hughey | Mar. 28, 1950 |
| 2,510,210 | Bucknam et al. | June 6, 1950 |

FOREIGN PATENTS

| Number | Country | Date |
| --- | --- | --- |
| 11,707 | Denmark | Jan. 9, 1909 |